United States Patent Office 3,478,600
Patented Nov. 18, 1969

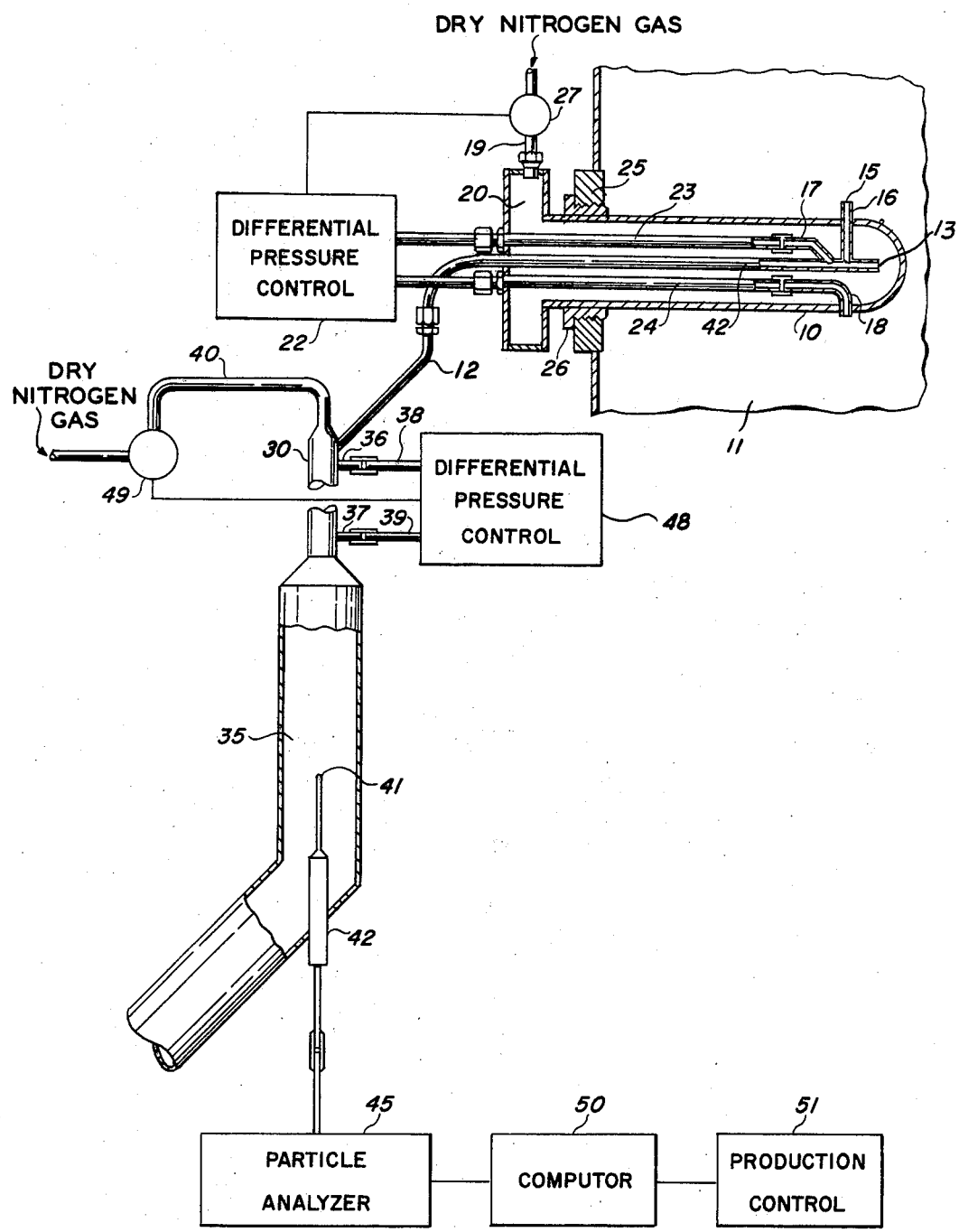
INVENTOR.
LEWIS G. LYNN

3,478,600
PARTICLE SIZE AND DISTRIBUTION ANALYZING APPARATUS
Lewis G. Lynn, Rochester, N.Y., assignor to Xerox Corporation, Rochester, N.Y., a corporation of New York
Filed Nov. 1, 1966, Ser. No. 591,180
Int. Cl. G01f *15/14;* G01j *5/04*
U.S. Cl. 73—432
6 Claims

ABSTRACT OF THE DISCLOSURE

Apparatus including a chamber having means associated therewith to divert a continuous representative sample of particulate material into a continuous flow of fluid being maintained within the chamber. Means are provided to detect and control the flow of fluid thru said chamber. A sampling tube is positioned in the chamber which is adapted to accept a continuous flow of material moving at the controlled volume rate of flow.

---

This invention relates to apparatus for controlling the size and distribution of a particulate material and, in particular, to apparatus for sampling, analyzing, and controlling the particle size of material as it is being processed.

More specifically, when a powder or particulate material is being produced in a fluid energy grinder of the like, the material is generally collected and stored in batches which are held until such time as each particular batch can be tested and approved. Holding the product during this testing period has created costly handling and storing problems and precludes the use of a continuous process. Elaborate batch sampling procedures have been devised which require mixing portions from various parts of a batch in an attempt to obtain a representative or true sample. However, no matter what the mixing procedure that is followed, the sample obtained can only be an indication of the actual size and distribution of the particulate material contained in a batch. That is, the range of sizes and distribution of the particles found in each batch is never truly determined because the testing is confined to a very minute, randomly selected, portion of the whole.

There is also a serious time delay between the processing and the discovery of defective materials when employing batch sampling. During this time lag between processing and analyzing of the material, it is possible to produce large quantities of defective material which cannot be commercially utilized. The lack of any corrective feedback information within a reasonable amount of time results in an unnecessary expense to the cost of manufacturing, due to scrapping and reprocessing.

It is, therefore, an object of this invention to improve apparatus for controlling the size distribution of a particulate material.

It is a further object of this invention to accurately analyze the particle size distribution of a particulate material as it is being produced.

It is yet another object of this invention to continually analyze the particle size distribution of a continuous flow of finely divided material as it leaves a grinding device.

Another object of this invention is to continually supply feedback information to production equipment for producing particulate material, the feedback information being based on a continuous analysis of the particle size distribution.

These and other objects of the present invention are obtained by continually obtaining and analyzing a representative sample of particulate material as the material is being discharged from a production device. The information so obtained then being processed to determine if the particle size and distribution is within a desired range and feedback information continually supplied to the production equipment.

For a better understanding of the present invention as well as other objects and features thereof, reference is had to the following detailed description of the invention to be read in connection with the accompanying drawing, wherein:

The figure is a sectional side elevation of a particle analyzing apparatus in accordance with the present invention.

In any substantially laminar flow system, the kinematics, or the geometry of the system's motion, does not change with the passage of time. That is, the velocity, pressure, density, and other dynamic characteristics of the system at any specific point in the system will not vary over a given period of time. This is true whether the force motivating the flow is gravity of a mechanically created head supplied from a pump or the like. However, it should be noted that the kinematics of a steady flow system will vary over a distance due to the forces acting on the flow stream. For example, fluid which is being pumped through a pipe will lose some of its energy because of the work the fluid must expend as it moves along the pipe. Therefore, it can be expected that there will be an energy loss downstream from the work source, this energy loss being reflected as a reduction in one or more of the dynamic characteristics of the system.

A laminar flow is best illustrated by a straight and stable column of cigarette smoke as it rises in still air. Likewise, a gas, liquid, or solid which is moving under laminar flow conditions will be moving along substantially straight and stable "path lines." For example, if the path followed by a small or minute particle falling through still air were traced, it would be found that the "path line" described by the particle over a period of time would also be very straight and stable. However, when some outside force is introduced in a laminar flow stream, the kinematics or geometry of the flow stream change because of the disturbance to the path lines.

It can be seen that the introduction of a sampling device into a laminar flow system would force the gas, and/or liquids and solid in transit to flow around the apparatus disturbing the straight and stable path lines. However if isokinetic conditions could be maintained along a relatively straight path line which passes through a receiver opening or orifice in the sampling device, a particle of matter moving along this line would sense or feel no disturbing changes in the system and, therefore, fall freely into the orifice. Collecting a series of these particles as they move along this path line would produce a true sample of the material in transit.

Referring now to the figure, a sampling device is shown for obtaining a true sample of a freely falling finely divided particle which is leaving the discharge station of a fluid energy grinder or the like. Housing 10 is shown inserted in a straight, round conduit 11 through which is flowing finely divided particles under laminar flow conditions. The housing is placed at some distance from the discharge station of the producing equipment (not shown) at a point in which relatively stable flow conditions are being maintained. The housing is secured in position by means of threaded male member 26 acting in conjunction with mounting block 25 which is permanently affixed to conduit 11. It should be noted that housing 10 is an independent unit capable of being removed from the conduit.

Sample particles are introduced into the housing through orifice 15 located in receiver tube 16. The receiver tube is positioned high enough into the flow stream that it is pot affected by any disturbances in the flow caused by housing 10. The received opening 15 is positioned so that its cross-sectional area is substantially perpendicular to the straight flow lines thereby permitting access to particles moving along the path lines. Receiver tube 16 is operationally connected to sampling tube 12 in such a manner that receiver opening 15 empties directly into the sampling tube.

An artificial atmosphere of dry nitrogen gas is maintained within sampling tube 12 as a means of controlling the pressure within the tube as well as a means of transporting particle samples out of the housing. Dry nitrogen is used in this preferred embodiment because it is an economical, readily available, relatively inert gas which will not chemically react with most known materials. It should be obvious, however, that any gas which is chemically inert could be used to produce an artificial atmosphere. The dry nitrogen is introduced into the system from a reservoir (not shown) through means of nitrogen supply line 19. Because the gas is supplied under some pressure through a relatively small line, there may be a disturbance at the point at which the gas enters the sampling device. Nitrogen line 19, therefore, is emptied first into plenum chamber 20 where stable conditions are established before introducing the mixture into the sampling tube through opening 13.

As previously noted, if no changes are made in the kinematic conditions found along a straight and stable line passing through receiver opening 15, a particle moving along this flow line, sensing no disturbances, will fall freely into the opening. In a flow system comprised of freely falling particles, the kinematics of the system are determined by the elevation of the freely falling particle above a given datum, there being no mechanical pressure of velocity head supplying energy to the system. If the pressure at the receiver opening in sampling tube 12 is maintained at a pressure equal to the pressure found in conduit 11, a particle falling along a path line passing through receiver opening 15 will feel no change in the kinematics of the system and, therefore, flow into the sampling tube 12.

Located immediately adjacent to the receiving tube is pressure tap 17 which is connected to one side of an automatic differential pressure control 22 by means of control line 23. Also located in the sampling housing directly below the orifice is a second pressure tap 18 which is connected to the other side of the automatic differential pressure control by means of control line 24. The pressure information being sent to the pressure control is the pressure found in the flow stream adjacent to the sampling housing and the pressure of the artificial atmosphere being maintained in the sampling tube. When a difference in pressure is noted, the automatic differential pressure control transmits a demand signal to automatic valve 27, located in nitrogen supply line 19, which opens or closes to supply more or less gas until equal pressure is again restored.

Sampling tube 12 carries the true sample of finely divided particles which has been captured out of housing 10 entrained in a flow of dry nitrogen gas. Usually more material is being diverted from the main flow stream in conduit 11 than can be continually tested by the analyzing equipment. That is, the volume rate of flow through the sampling tube is generally greater than the volume rate of flow passing through the analyzing equipment. To reduce the amount of particles per unit volume and also to reduce the gaseous flow rate, sampling tube 12 is emptied into a cylindrically shaped expansion chamber 35 which has a known cross-sectional area substantially greater than that of the sampling tube.

A sample of the material which is in transit through expansion chamber 35 is delivered to analyzer 45 through orifice 41 located in a second sampling tube 42. Here again a true and accurate sample must be obtained but, further, the sample must be delivered to the analyzer at a rate of flow that the testing apparatus is capable of continually testing.

As shown in FIG. 1, sampling tube 12 empties into a plenum 30 which is of a known inside diameter slightly larger than that of sampling tube 12. Also emptying into plenum 30, at a point adjacent to the point of entry of sampling tube 12, is a second dry nitrogen supply line 40. Experiments have shown that the rate of flow in the laminar flow system can be determined by measuring the difference in pressure over a given length in a tube of known diameter. In the present invention, this latter principle is used to control the rate of flow within tube 30 by controlling the amount of dry nitrogen gas that is introduced into tube 30. That is, a pressure differential is maintained between pressure taps 36 and 37 (a known length) in plenum 30 (a known inside diameter) by controlling the amount of dry nitrogen gas introduced into the tube through line 40 to produce a desired resultant rate of flow.

Pressure taps 36 and 37 are connected to a differential pressure control 48 through means of lines 38 and 39, respectively. It should be noted that pressure tap 36 is positioned far enough downstream from the point of entries of lines 12 and 40 to ensure that laminar flow conditions exist at the tap. The pressure control 48 is preset so that it will sense any change in the desired pressure differential and transmit a signal to open or close automatic valve 49. Opening and closing of valve 49 regulates the flow of nitrogen gas through plenum 30 in accordance with the signal transmitted until such time as the required pressure differential is again restored thus maintaining a desired velocity or rate of flow through the tube. The controlled flow from plenum 30 is then emptied into expanded chamber 35, also of known inside diameter, to disperse the gas entrained particulate material over a wider cross-sectional area. As can be seen, any desired rate of flow through chamber 35 can be maintained by controlling the volume rate of flow from the plenum.

Located at the bottom of expansion chamber 35 is a second sampling tube 42 which has a receiver opening of known diameter positioned to face upstream in the laminar flow. The sampling tube is operatively connected to particle analyzer 45 which is capable of continually analyzing a steady flow of finely divided gas entrained particles being diverted from the expansion chamber. Analyzing devices such as this which are capable of continually sampling particulate material are commercially manufactured by the Royco Instrument Company of Menlo Park, Calif.

Thin wall sampling tube 42 is positioned vertically in the laminar flow stream thereby producing a minimum amount of disturbance in the relatively straight and stable path lines. A true sample is diverted from the flow found in expansion chamber 35 by maintaining the velocity of the flow stream in the expansion chamber substantially equal to the velocity of the flow found in sampling tube 42. For example, if the working rate of flow of the analyzer is known, that is the flow rate at which the analyzer will continually test particle samples, and the size of the orifice 41 in the sampling tube known, the velocity through the tube can be determined. By regulating the pressure differential found in plenum 30, the velocity in the chamber can be made substantially equal to that of the analyzing device. A particle which is traveling along a flow path in the expansion chamber which passes through the receiver opening in sampling tube 42 will therefore sense no disturbance or changes in the stable flow conditions and fall freely into the sampling tube. The particles are then carried to the particle analyzer at a rate at which the analyzer is capable of testing particulate material.

The dispersed material flowing through expansion chamber 35 which is not captured in sampling tube 42 is carried to a collecting station (not shown) where it is stored in filter bags or the like and periodically removed from the system.

The data as to the particle size and distribution which is continually being obtained by analyzer 45 is fed to a computer 50 where the information is compared to the preprogrammed range of sizes and distributions stored in the computer. The computer feeds back information to the production control equipment 51 which, if necesary, adjusts the production equipment so that particulate material within the desired size and distribution range is produced. Because the means and apparatus to analyze and compare data, as herein disclosed, are known in the art, these operations will not be discussed in detail. These prior art devices are shown schematically in FIG. 1.

While the invention has been described with reference to the structure disclosed herein, it is not confined to the details set forth, and this application is intended to cover such modifications or changes as may come within the purposes of the improvements.

What is claimed is:

1. Apparatus for continually diverting a representative sample of a particulate material from a source at a desired rate of flow including
   a plenum chamber having first and second receiving stations mounted adjacent to one another therein,
   means to divert a continuous representative sample of a particulate material from the source and being adapted to introduce the diverted particulate material into said plenum chamber at the first receiving station,
   means to introduce a continuous flow of fluid into said said plenum chamber at the second receiving station whereby the particulate material introduced at the first receiving station is entrained in a continuous fluid flow,
   a sampling tube in communication with said plenum chamber,
   detecting means in said plenum chamber to determine the rate of flow of the fluid entrained particulate material through said chamber,
   control means being operable by said detecting means for regulating the flow of fluid introduced into said plenum chamber whereby a continuous flow of fluid entrained particulate material is delivered to the sampling tube at a pedetermined rate.

2. The apparatus of claim 1 wherein said sampling tube has a constant inside diameter whereby fluid entrained particulate material is delivered from said plenum chamber at a known volume rate of flow.

3. The apparatus of claim 2 having further analyzing means operatively connected to said sampling tube to continually produce analytical data concerning size and distribution of said fluid entrained particulate material at a volume rate of flow substantially equal to that delivered by said sampling tube, 4. The apparatus of claim 3 wherein the fluid introduced into said plenum chamber at the second receiving station comprises relatively chemically inert gas.

5. Apparatus for continually regulating the production equipment producing particulate material in response to analytical data concerning the size and distribution of the particulate material being discharged from said production equipment including
   a phenum chamber having first and second receiving stations mounted adjacent to one another therein,
   means to divert a continuous representative sample of particulate material being discharged from the production apparatus and being adapted to introduce the diverted particulate material into said plenum chamber at the first receiving station,
   means to introduce a continuous flow of fluid into said plenum chamber at the second receiving station whereby the particulate material introduced at the first receiving station is entrained in a continuous fluid flow,
   a sampling tube in communication with said plenum chamber,
   detecting means in said plenum chamber to determine the rate of flow of the fluid entrained particulate material through said chamber,
   control means being operable by said detecting means for regulating the flow of fluid introduced into said plenum chamber whereby a continuous flow of fluid entrained material is delivered to the sampling tube at a predetermined rate,
   analyzing means operatively connected to said sampling tube adapted to produce analytical data concerning the size and distribution of the fluid entrained particulate material continuously at the rate delivered by said sampling tube,
   means to evaluate the data derived from said analyzing means and to produce signals capable of controlling the production of said particulate material in response to the evaluated data.

6. The apparatus of claim 5 wherein the entraining fluid comprises dry nitrogen gas.

References Cited

UNITED STATES PATENTS

| | | | |
|---|---|---|---|
| 2,452,224 | 10/1948 | Collett | 73—421.5 |
| 3,138,029 | 6/1964 | Rich | 73—432 |
| 3,220,261 | 11/1965 | Kriebel | 73—432 |

LOUIS R. PRINCE, Primary Examiner

HARRY C. POST III, Assistant Examiner

U.S. Cl. X.R.

73—28, 422